United States Patent
Murai et al.

(10) Patent No.: US 10,606,236 B2
(45) Date of Patent: Mar. 31, 2020

(54) CONTROL DEVICE, CONTROL METHOD, AND CONTROL PROGRAM

(71) Applicant: OMRON Corporation, Kyoto (JP)

(72) Inventors: Masahiro Murai, Kusatsu (JP); Yukio Iname, Kyoto (JP)

(73) Assignee: OMRON Corporation, Kyoto (JP)

( * ) Notice: Subject to any disclaimer, the term of this patent is extended or adjusted under 35 U.S.C. 154(b) by 161 days.

(21) Appl. No.: 15/814,413

(22) Filed: Nov. 16, 2017

(65) Prior Publication Data

US 2018/0224824 A1   Aug. 9, 2018

(30) Foreign Application Priority Data

Feb. 8, 2017   (JP) .................................. 2017-021252

(51) Int. Cl.
| | | |
|---|---|---|
| *G05B 13/04* | (2006.01) | |
| *G05B 17/02* | (2006.01) | |
| *G05B 19/401* | (2006.01) | |
| *G05B 19/19* | (2006.01) | |
| *G05B 19/416* | (2006.01) | |
| *G05B 19/408* | (2006.01) | |

(52) U.S. Cl.
CPC .......... *G05B 19/401* (2013.01); *G05B 13/044* (2013.01); *G05B 17/02* (2013.01); *G05B 19/19* (2013.01); *G05B 19/4083* (2013.01); *G05B 19/416* (2013.01); *G05B 2219/33131* (2013.01); *G05B 2219/35303* (2013.01)

(58) Field of Classification Search
CPC ....... G05B 13/04; G05B 17/02; G05B 19/401
See application file for complete search history.

(56) References Cited

U.S. PATENT DOCUMENTS

| | | |
|---|---|---|
| 2008/0027691 A1 | 1/2008 | Kobayashi et al. |
| 2015/0066468 A1* | 3/2015 | Damgaard ............. G05B 17/02 703/18 |

FOREIGN PATENT DOCUMENTS

| | | |
|---|---|---|
| EP | 1659461 | 5/2006 |
| EP | 2045673 | 4/2009 |
| JP | 2009-122778 | 6/2009 |

OTHER PUBLICATIONS

"Search Report of Europe Counterpart Application", dated May 4, 2018, p. 1-p. 4, in which the listed references were cited.

* cited by examiner

*Primary Examiner* — Mark A Connolly
(74) *Attorney, Agent, or Firm* — JCIPRNET (57) ABSTRACT

A control parameter is adjusted without the need to operate a driver of a control target. A control device (10) includes a model identification unit (12), a parameter determination unit (132), a data evaluation unit (131) and an operation data calculation unit (133). The model identification unit (12) identifies a physical model of an operation of the control target. The operation data calculation unit (133) calculates operation data by using the physical model and the control parameter. The data evaluation unit (131) calculates an evaluation value by using normative data of the operation of the control target and the operation data. The parameter determination unit (132) determines the control parameter by using the evaluation value.

17 Claims, 11 Drawing Sheets

CONTROL DEVICE, CONTROL METHOD, AND CONTROL PROGRAM

CROSS-REFERENCE TO RELATED APPLICATION

This application claims the priority benefit of Japan Patent application no. 2017-021252, filed on Feb. 8, 2017. The entirety of the above-mentioned patent application is hereby incorporated by reference herein and made a part of this specification.

BACKGROUND

Technical Field

The present disclosure relates to a control device, a control method, and a control program for setting control parameters of motors.

Description of Related Art

Various methods for adjusting control parameters of motors and the like have been devised. For example, Patent Literature 1 discloses a control parameter adjustment device of a positioning control apparatus.

This control parameter adjustment device transmits a control parameter to a servo driver and acquires actual position data from the servo driver. The control parameter adjustment device extracts a settling feature quantity from normative position data and actual position data and evaluates the settling feature quantity by using an allowable value. The control parameter adjustment device adjusts the control parameter by using the evaluation result.

[Patent Document 1] Japanese Patent Application Publication (JP-A) No. 2009-122778

However, in the configuration and the method disclosed in Patent Literature 1, a control parameter cannot be adjusted if actual data acquired by operating a driver is not used.

Accordingly, the present disclosure provides a technology for adjusting a control parameter without the need to continuously operate a driver of a control target.

SUMMARY

A control device of the present disclosure includes a model identification unit, an operation data calculation unit, a data evaluation unit, and a parameter determination unit. The model identification unit identifies a physical model of an operation of a control target. The operation data calculation unit calculates operation data by using a control parameter applied to the control target and the physical model. The data evaluation unit calculates an evaluation value by using normative data of the operation of the control target and the operation data. The parameter determination unit determines the control parameter by using the evaluation value.

In this configuration, the control parameter is determined by processing data in the control device.

According to the present disclosure, it is possible to adjust a control parameter without the need to continuously operate a driver which is a control target.

DESCRIPTION OF THE EMBODIMENTS

Figure 1:
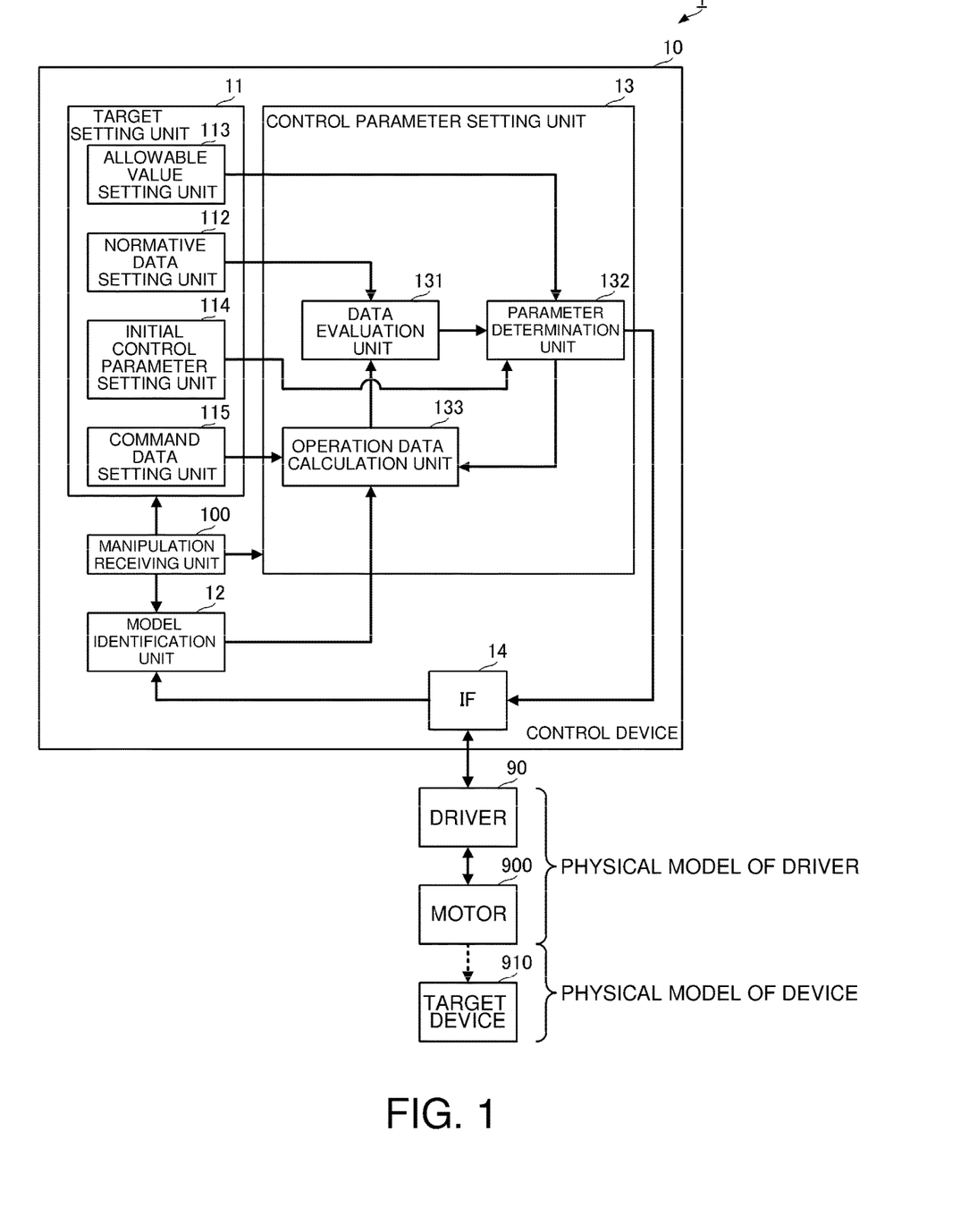
FIG. 1 is a block diagram illustrating a major configuration of a control device and a control system according to a first embodiment of the present disclosure.
Figure 2:
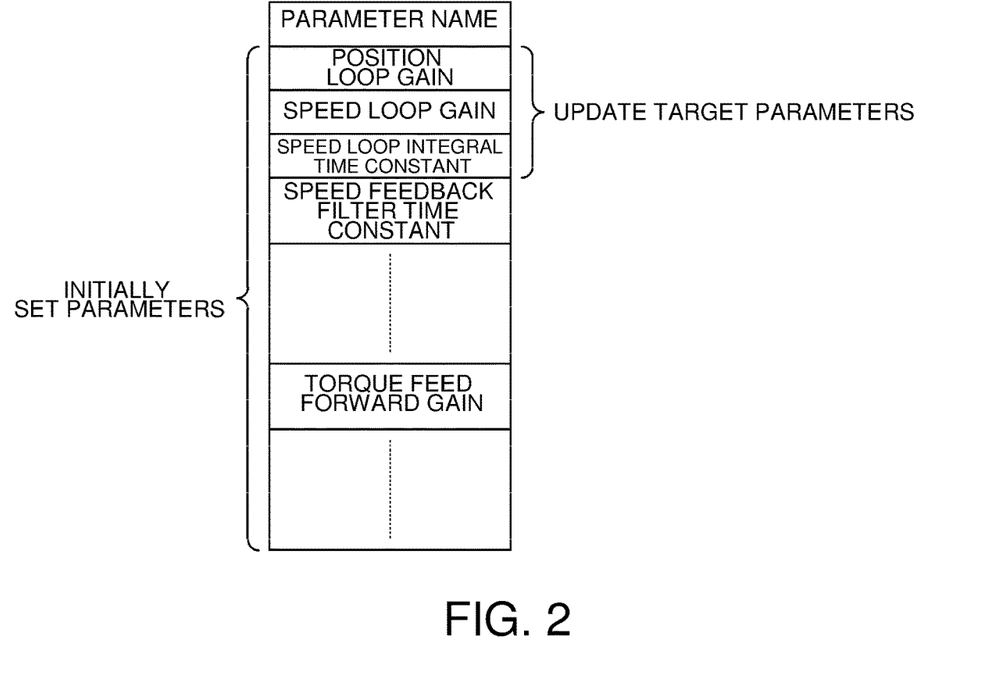
FIG. 2 is a table showing an example of control parameters.
Figure 3:
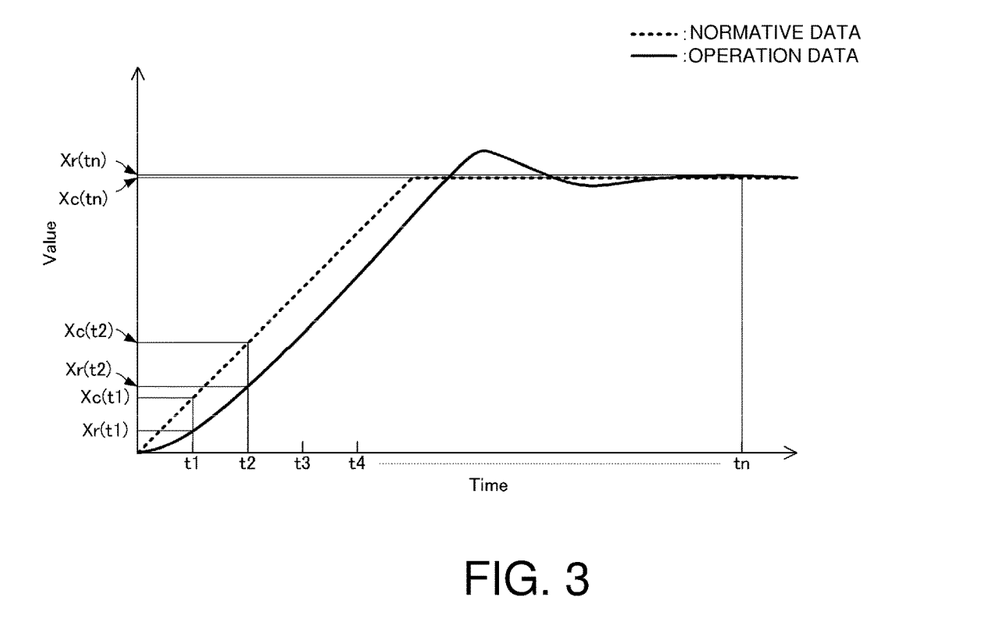
FIG. 3 is a diagram illustrating the concept of an evaluation value.

A control device, a control method and a control program according to a first embodiment of the present disclosure will be described with reference to the drawings. FIG. 1 is a block diagram illustrating a major configuration of a control device and a control system according to the first embodiment of the present disclosure. FIG. 2 is a table showing an example of control parameters. FIG. 3 is a diagram illustrating the concept of an evaluation value.

As illustrated in FIG. 1, a control system 1 includes a control device 10, a driver 90, a motor 900, and a target device 910. The control device 10 includes a target setting unit 11, a model identification unit 12, a control parameter setting unit 13, an interface (IF) unit 14, and a manipulation receiving unit 100. The control parameter setting unit 13 includes a data evaluation unit 131, a parameter determination unit 132, and an operation data calculation unit 133.

The target setting unit 11, the model identification unit 12 and the control parameter setting unit 13 are configured as information processing devices such as a CPU, an MPU and the like and programs executed by the information processing devices.

The control device 10 is connected to the driver 90 through the IF unit 14. The driver 90 is a device to which a control parameter set by the control device 10 is applied. The driver 90 is connected to the motor 900 which is a control target and the motor 900 is connected to the target device 910.

The driver 90 controls the motor 900 according to a control parameter applied by the control device 10. For example, if the motor 900 is a servo motor, the driver 90 is a servo driver. A predetermined tact in the target device 910 is executed according to the operation of the motor 900.

The manipulation receiving unit 100 is configured as a keyboard, a mouse, a touch panel or the like and receives manipulation from an operator. For example, the manipulation receiving unit 100 receives a control parameter setting manipulation from the operator. The manipulation receiving unit 100 instructs the target setting unit 11, the model identification unit 12 and the control parameter setting unit 13 to execute a control parameter optimization process on the basis of reception of the manipulation. Meanwhile, the manipulation receiving unit 100 may be provided outside the control device 10 instead of being included in the control device 10.

The target setting unit 11 includes a normative data setting unit 112, an allowable value setting unit 113, an initial control parameter setting unit 114, and a command data setting unit 115. The normative data setting unit 112 sets normative data serving as a norm of the operation of the motor 900 according to a manipulation input of the operator. The normative data, like operation data which will be described below, is a numerical value indicating an operation of the motor 900, such as speed, torque, position and the like.

Further, the normative data is stored in advance for each type of the motor 900, and the target setting unit 11 may read the stored normative data when the motor 900 is selected by the manipulation receiving unit 100. In addition, the target setting unit 11 may set the normative data in response to a manual input of the operator through the manipulation receiving unit 100. For example, the normative data is data represented by a dotted line of FIG. 3. The normative data setting unit 112 outputs the normative data to the data evaluation unit 131.

The allowable value setting unit 113 sets an allowable value of an evaluation value used during parameter determination, which will be described below, in response to a manipulation input of the operator. The allowable value is appropriately set depending on the operation accuracy, response speed and the like of the motor 900. The allowable value setting unit 113 outputs the allowable value to the parameter determination unit 132.

The initial control parameter setting unit 114 sets an initial value of the parameter determination unit 132. Here, the initial control parameter setting unit 114 sets all parameters to be set to the motor 900.

The command data setting unit 115 sets command data and outputs the command data to the operation data calculation unit 133. The command data is a basis of operation data, and subsequent operation data of the next time is calculated from the difference between the operation data up to a certain moment in time and the command data.

The model identification unit 12 identifies a physical model of a driver and a physical model of a device. For example, the model identification unit 12 acquires information such as specifications of the driver 90, the motor 900 and the target device 910 through the IF unit 14, and identifies a physical model of the driver and a physical model of the device using such information. The physical model of the driver is data representing an input/output relationship wherein normative data output from the control data 10 to the driver 90 is regarded as an input and an external force applied from the motor 900 to the target device 910 is regarded as an output. In addition, the physical model of the device is data representing an input/output relationship wherein an external force applied from the motor 900 to the device is regarded as an input and a predetermined output (e.g., a measurement value) of the motor 900 is regarded as an output. A physical model may be acquired by operating the motor 900 once in advance or may be appropriately acquired in advance on the basis of additional specifications which can be input and output, and the like.

For example, when the motor 900 is a servo motor, the aforementioned information may include rated values of the motor, presence or absence of a motor brake, an encoder resolution, an inertia ratio and the like. In addition, the information includes all control parameters (initially set parameters) set to a servo driver as illustrated in FIG. 2. Although FIG. 2 shows some control parameters, various control parameters related to control of position, speed and torque, for example, a position loop gain, a speed loop gain, a speed loop integral time constant, a speed feedback filter time constant, a torque feed forward gain, and the like may be included.

The model identification unit 12 outputs the physical models of the driver and the device to the operation data calculation unit 133.

The operation data calculation unit 133 outputs operation data by using a control parameter determined by the parameter determination unit 132, the physical model of the driver, the physical model of the device, and the command data. The operation data is a numerical value representing an operation of the motor 900 and indicates a speed, a torque, a position and the like. For example, the operation data may be represented by the solid line of FIG. 3. The operation data calculation unit 133 outputs the operation data to the data evaluation unit 131.

Meanwhile, control parameters input from the parameter determination unit 132 affect the operation performance (accuracy, convergence speed (settling time)) of the motor 900. For example, when the motor 900 is a servo motor, the control parameters include a position loop gain, a speed loop gain, a speed loop integral time constant, etc.

The data evaluation unit 131 calculates an evaluation value by using the operation data and the normative data. Specifically, as shown in FIG. 3, the data evaluation unit 131 performs discrete sampling on the operation data and the normative data on the time axis, and acquires operation data $Xr(tn)$ and normative data $Xc(tn)$ of each time $tm$ ($m=1$ to $n$). The data evaluation unit 131 calculates a difference value (based on the normative data $Xc(tn)$) between the operation data $Xr(tn)$ and the normative data $Xc(tn)$ at each time $tm$. The data evaluation unit 131 calculates a norm from this difference value and regards the norm as an evaluation value. The data evaluation unit 131 outputs the evaluation value to the parameter determination unit 132.

L1 norm, L2 norm, L∞ norm (a maximum difference between the operation data and the nonnative data) or the like can be used as a norm. L1 norm is the sum of differences between the operation data and the normative data, L2 norm is the sum of the square of the differences between the operation data and the normative data, and L∞ norm is the maximum difference between the operation data and the normative data. Such norms may be appropriately selected depending on the purpose. When the L1 norm is used, a settling time can be reduced. When the L∞ norm is used, an overshoot amount can be decreased. When the L2 norm is used, the settling time and the overshoot amount can be appropriately adjusted.

The parameter determination unit 132 compares the evaluation value with the allowable value to determine a control parameter suitable for the driver 90. Here, the control parameters to be determined need not be all of the initially set parameters and may be a position loop gain, a speed loop gain, or a speed loop integral time constant, for example. The control parameter determined by the parameter determination unit 132 can be appropriately set by the operator. If the evaluation value is less than the allowable value, the parameter determination unit 132 adopts a control parameter set to the operation data calculation unit 133 at that time.

On the contrary, when the evaluation value is equal to or greater than the allowable value, the parameter determination unit 132 changes the control parameter using a known optimization algorithm and outputs the changed control parameter to the operation data calculation unit 133. The parameter determination unit 132 outputs the adopted control parameter to the driver 90 through the IF unit 14.

By realizing the above-described configuration, the control device 10 can set a control parameter suitable for the driver 90 without the need to continuously operate the driver 90 and the motor 900 (without setting the driver 90 and the motor 900 in usual operation states). That is, it is possible to set a control parameter suitable for the driver 90 simply by acquiring initial operation parameters.

Figure 4:
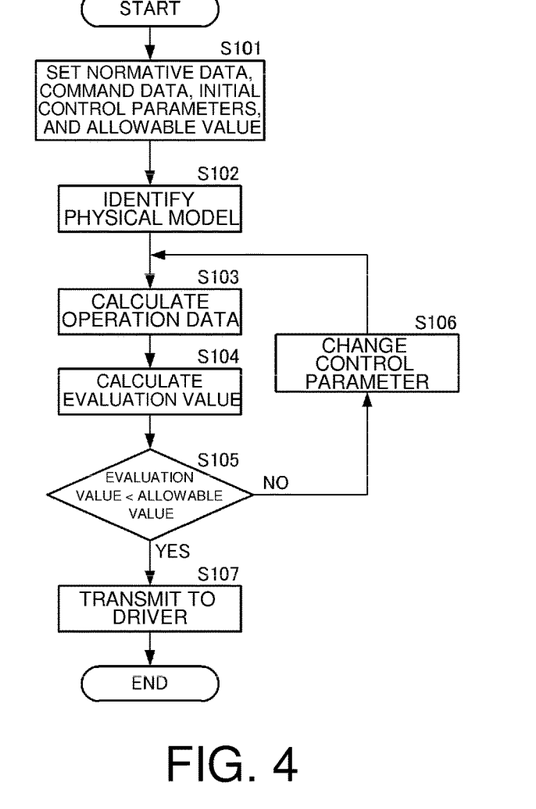
FIG. 4 is a flowchart illustrating a control method according to the first embodiment of the present disclosure.
Figure 5:
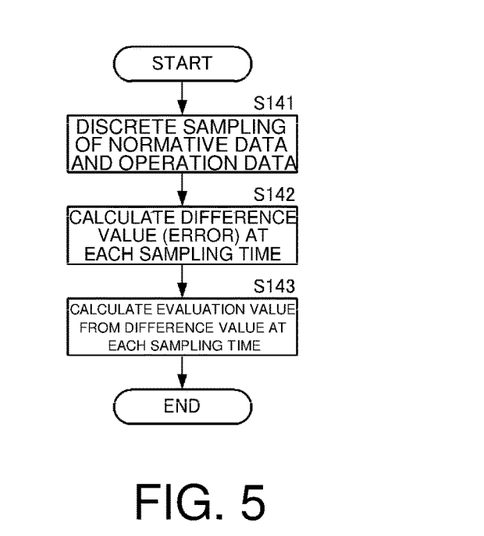
FIG. 5 is a flowchart illustrating a method of calculating an evaluation value.

A control parameter is set separately for a plurality of functional units has been shown in the above description, processes illustrated in FIGS. 4 and 5 may be performed through an information processing device and a program as described above. Meanwhile, a detailed process of each step below has been described above, and thus detailed description thereof will be omitted. FIG. 4 is a flowchart illustrating a control method according to the first embodiment of the present disclosure. FIG. 5 is a flowchart illustrating a method of calculating an evaluation value.

An information processing device sets normative data and an allowable value (S101). The information processing device identifies a physical model (S102). The information processing device calculates operation data by using the physical model, a control parameter, and command data (S103).

The information processing device calculates an evaluation value using the normative data, the command data, an initial control parameter, and the allowable value (S104). More specifically, the information processing device performs discrete sampling on the normative data and the operation data (S141). The information processing device calculates a difference value between the operation data and the normative data on the basis of the normative data at each sampling time (S142). The information processing device calculates a norm as an evaluation value from the difference value at each sampling time (S143).

When the evaluation value is equal to or greater than the allowable value (NO in S105), the information processing device changes the control parameter (S106) and returns to step S103. When the evaluation value is less than the allowable value (YES in S105), the information processing device transmits a control parameter serving as the basis of the evaluation value to the driver 90 (S107).

Figure 6:
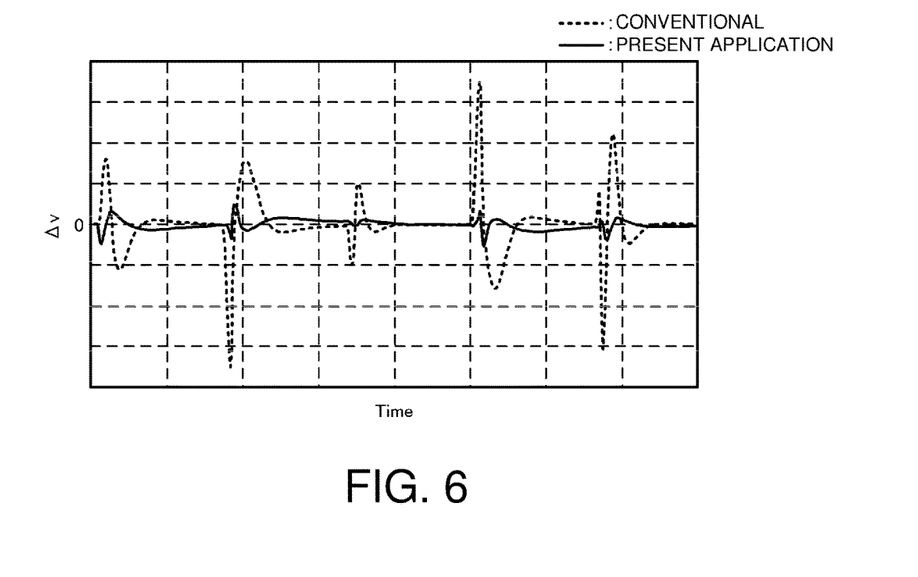
FIG. 6 is a graph showing a difference between operation data and normative data in an embodiment of the present disclosure and a conventional aspect.

FIG. 6 is a graph showing a difference between operation data and normative data in an embodiment of the present disclosure and an embodiment of a conventional art. It is desirable that this difference be small. In FIG. 6, the solid line represents a case in which the embodiment of the present disclosure is adopted and the dotted line represents a case in which the embodiment of the conventional art is adopted. In FIG. 6, the horizontal axis represents time and the vertical axis represents a speed difference $\Delta v$. Further, similar results are obtained with respect to a torque and thus description of the torque difference is omitted.

As shown in FIG. 6, a locally generated difference is decreased by using the embodiment of the present disclosure. That is, control can be realized to be closer to the nonnative data. Meanwhile, a portion where a difference is locally generated is a portion where the speed abruptly changes, and even in such the portion, more accurate follow-up control for the normative data can be realized by using the embodiment of the present disclosure. That is, it is possible to realize more suitable control depending on the driver 90, the motor 900 and the target device 910. In this case, a control parameter can be set without continuously operating the driver 90 and the motor 900 (without setting the driver 90 and the motor 900 in usual operation states), as described above. That is, it is possible to set a suitable control parameter simply by acquiring initial operation parameters.

Although a method of calculating an evaluation value for one control parameter has been illustrated in the above description, evaluation values for a plurality of control parameters can be calculated through the following methods.

(1) A plurality of evaluation values are weighted and added.
(2) One evaluation value is restricted and other evaluation values are minimized (within an allowable value).

More appropriate control parameters can be set in the case of (1), and a settling time can be reduced in the case of (2).

Figure 7:
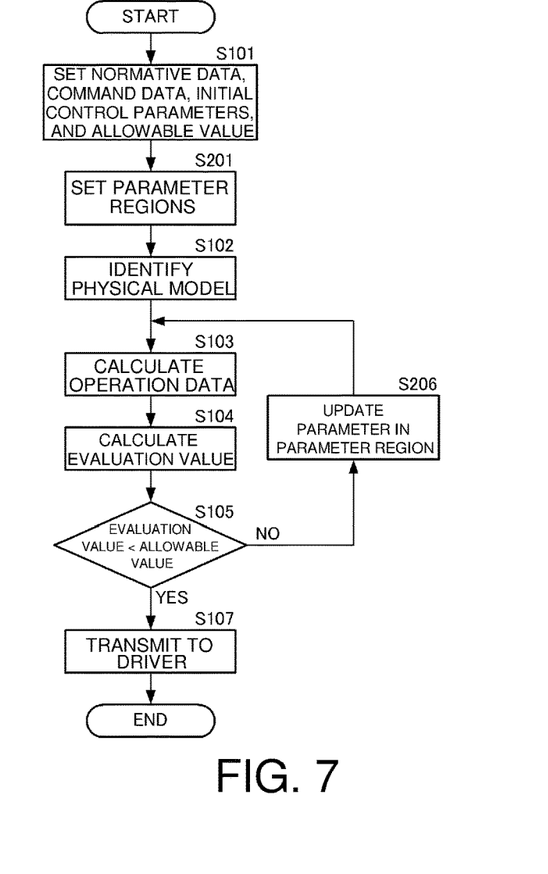
FIG. 7 is a flowchart illustrating another control method according to the first embodiment of the present disclosure.
Figure 8A:
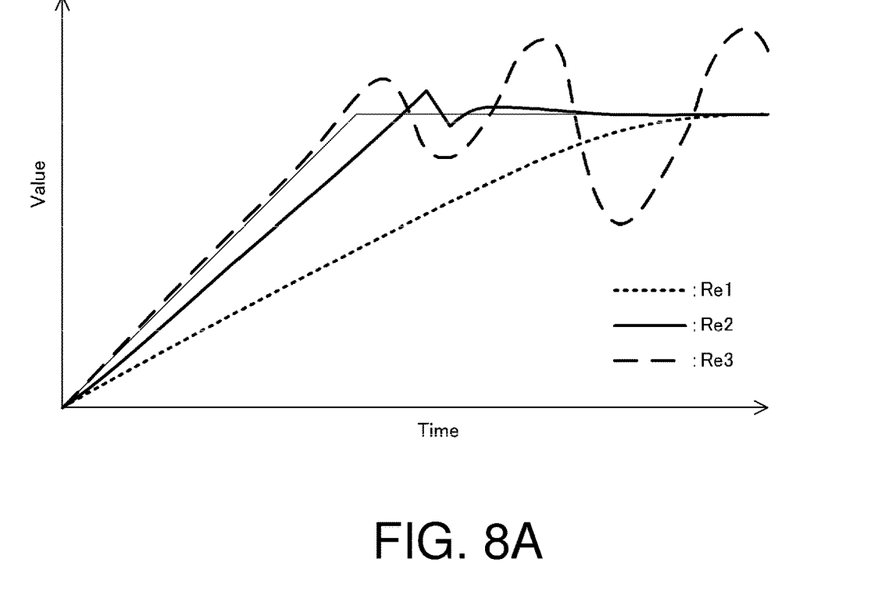
FIG. 8A illustrates waveforms of operation data when each parameter region is used.
Figure 8B:
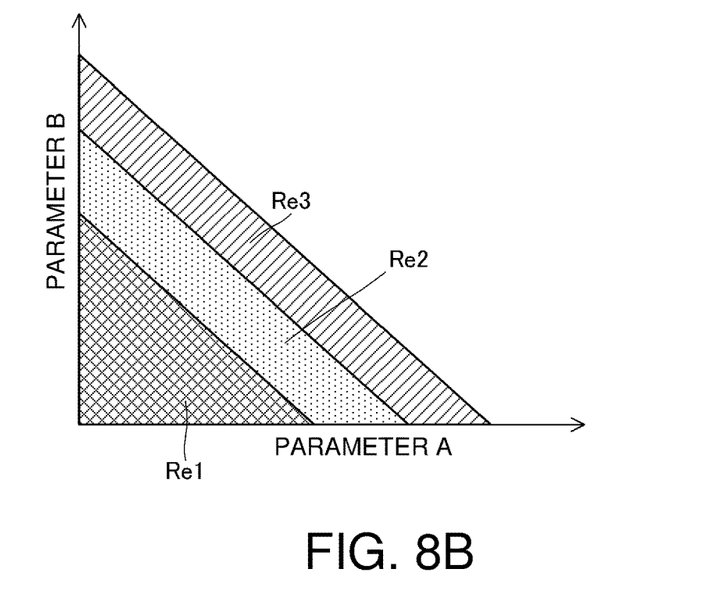
FIG. 8B illustrates a relationship between parameter regions.

In addition, the following process may be performed for the above-described control device, control method, and control program. FIG. 7 is a flowchart illustrating another control method according to the first embodiment of the present disclosure. FIG. 8A and FIG. 8B are diagrams for describing restriction of a parameter setting region, FIG. 8A shows waveforms of operation data when each parameter region is used, and FIG. 8B is a diagram illustrating a relationship between parameter regions. Although FIG. 8A and FIG. 8B illustrate a case of two types of control parameters (parameter A and parameter B), the same concept can also be applied when one or three or more types of control parameters are provided.

In this control device, control method, and control program, settable regions of control parameters are specified. Other processes are the same as in the control device, control method and control parameter according to the first embodiment, and thus description of the same parts is omitted.

As illustrated in FIG. 7, the control device (information processing device) sets a parameter region (S201). The parameter region specifies a range of settable values of the control parameter in a control parameter optimization algorithm. In addition, the control device (information processing device) changes a control parameter within an available control parameter range set by the parameter region (S206) when an evaluation value is equal to or greater than an allowable value (NO in S105).

Specifically, parameter regions Re1, Re2 and Re3 are set as shown in FIG. 8A and FIG. 8B. The parameter region Re1 corresponds to a case of using a control parameter in which the waveform of operation data gradually rises and thus initial followability to normative data is low, and the operation data coincides with the normative data over time. The parameter region Re2 corresponds to a case of using a control parameter in which rising of the waveform of operation data is slower than normative data but there is a certain degree of followability to the normative data, and the operation data coincides with the normative data after slight overshoot. The parameter region Re3 corresponds to a case of using a control parameter in which vibration is repeated although the performance of operation data to follow normative data in an initial stage is high.

In this case, for example, the parameter region Re3 is not used. The parameter region Re1 is used during execution of the optimization algorithm but is not used for a finally determined control parameter. The parameter region Re2 is used during execution of the optimization algorithm and for a finally determined control parameter.

It is possible to correctly set a suitable control parameter by restricting control parameters in this manner.

Figure 9:
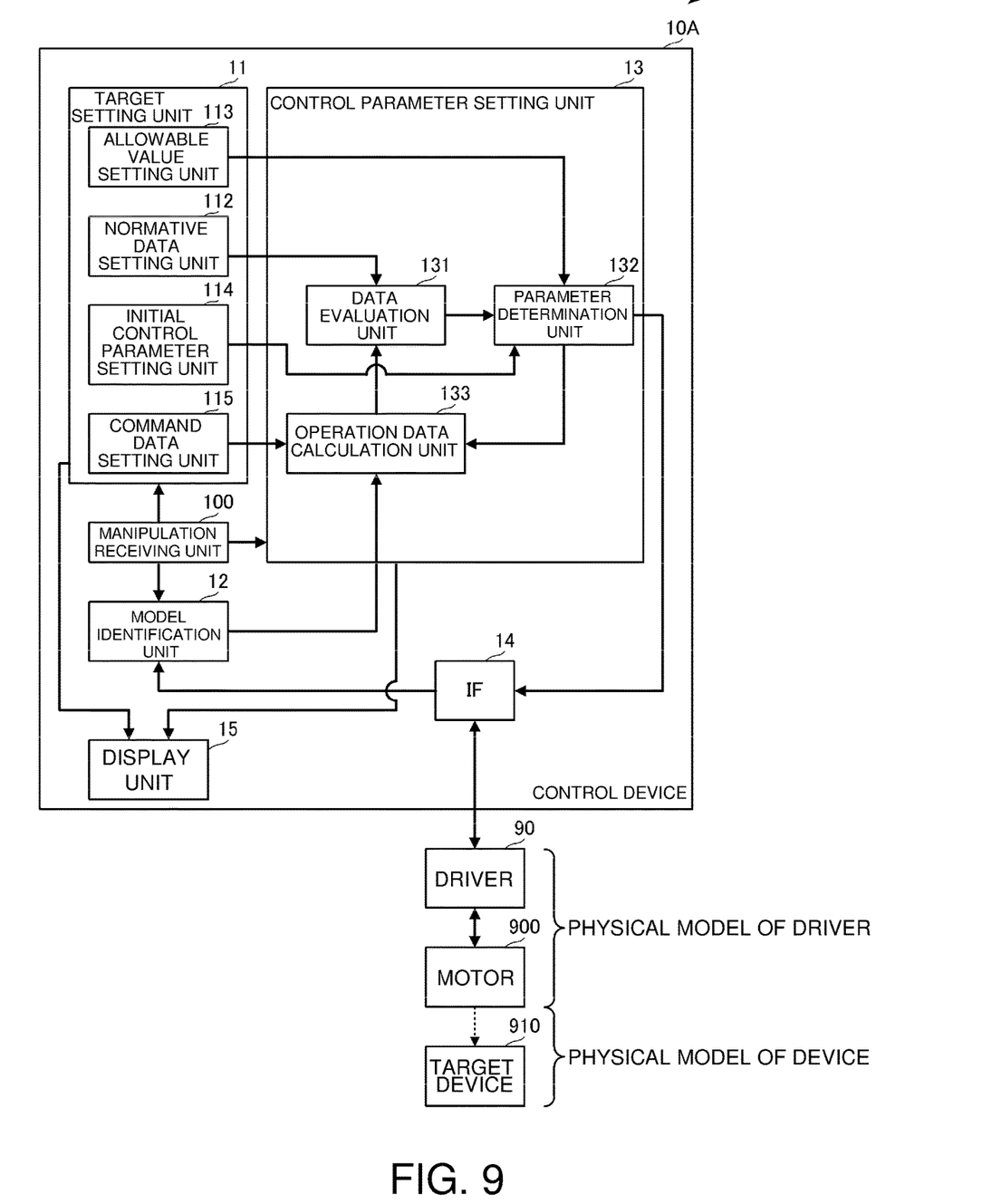
FIG. 9 is a block diagram illustrating a major configuration of a control device and a control system according to a second embodiment of the present disclosure.

Next, a control device, a control method, and a control program according to a second embodiment of the present disclosure will be described with reference to the drawings. FIG. 9 is a block diagram illustrating a major configuration of a control device and a control system according to the second embodiment of the present disclosure.

As illustrated in FIG. 9, a control device 10A of a control system 1A according to the second embodiment differs from the control device 10 according to the first embodiment in that the former includes a display unit 15. Other basic components of the control device 10A are the same as those of the control device 10 and thus description of the same parts is omitted.

The display unit 15 displays data related to control parameter setting performed in the control device 10A. For example, the display unit 15 displays waveforms of operation data and normative data according to a control parameter set by the aforementioned optimization algorithm, as illustrated in FIG. 3. Accordingly, the operator can easily check how the motor 900 is operating according to the control parameter set on the basis of the normative data. In addition, the display unit 15 displays the above-described parameter regions and thus a position at which a control parameter is set according to execution of the optimization algorithm for each region can be easily recognized. Meanwhile, the display unit 15 may be provided outside of the control device 10A instead of being included in the control device 10A.

Figure 10A:
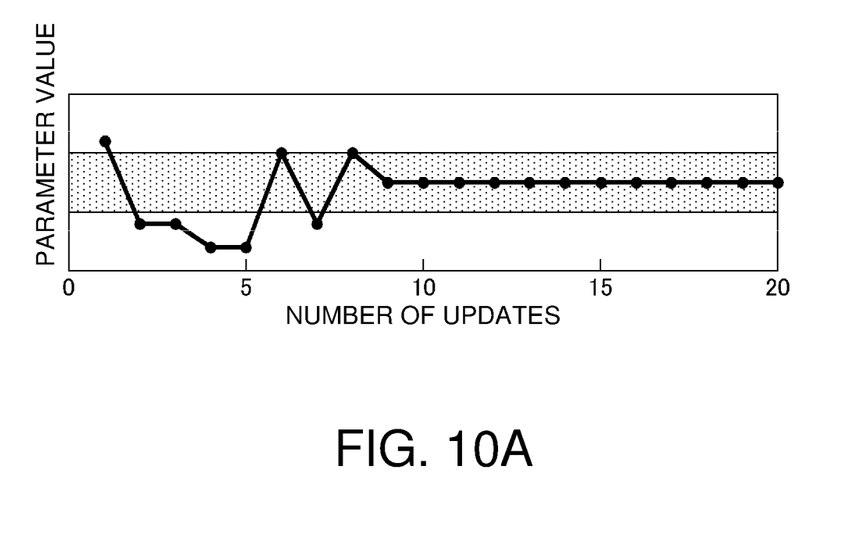
FIG. 10A is a diagram illustrating a relationship between a control parameter value and a settable range.
Figure 10B:
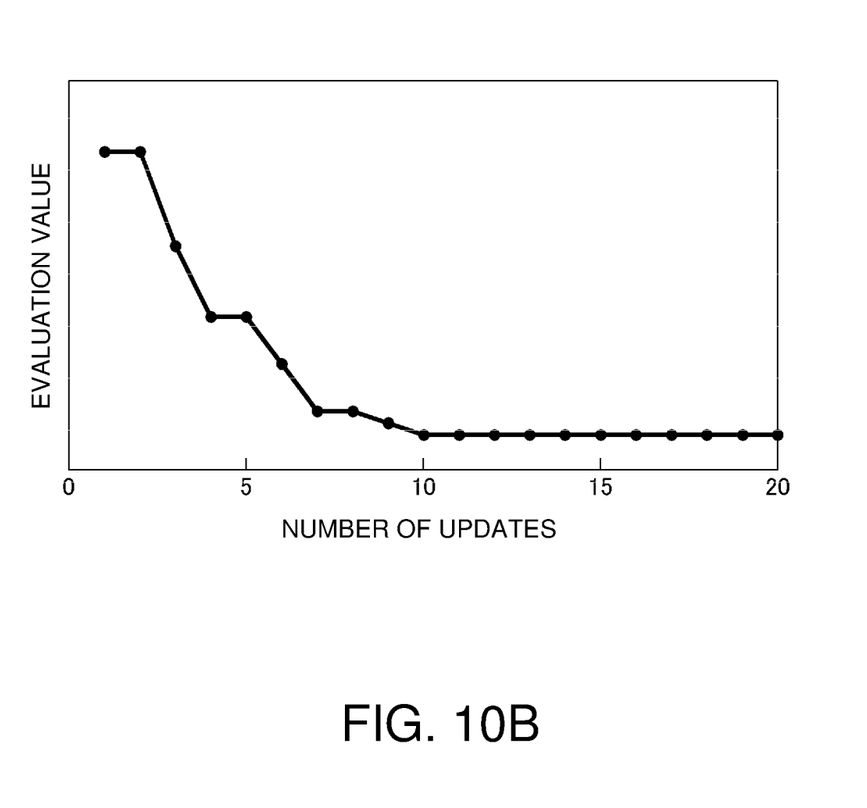
FIG. 10B is a diagram illustrating a variation in an evaluation value depending on the number of updates.

FIG. 10A and FIG. 10B is a diagram illustrating examples of a display screen in the control device according to the second embodiment. FIG. 10A is a diagram illustrating a relationship between a control parameter value and a settable range, in which the horizontal axis represents the number of updates (the number of times the setting of the control parameter is changed by using the optimization algorithm) and the vertical axis represents the control parameter value. FIG. 10B is a diagram illustrating a variation in an evaluation value depending on the number of updates, in which the horizontal axis represents the number of updates and the vertical axis represents the evaluation value. In the case of FIG. 10A, the operator can easily check whether the control parameter is in a predetermined parameter region. In the case of FIG. 10B, the operator can easily recognize that the evaluation value has converged on a small value.

Accordingly, the operator can easily recognize whether the control parameter has been optimally set.

Figure 11:
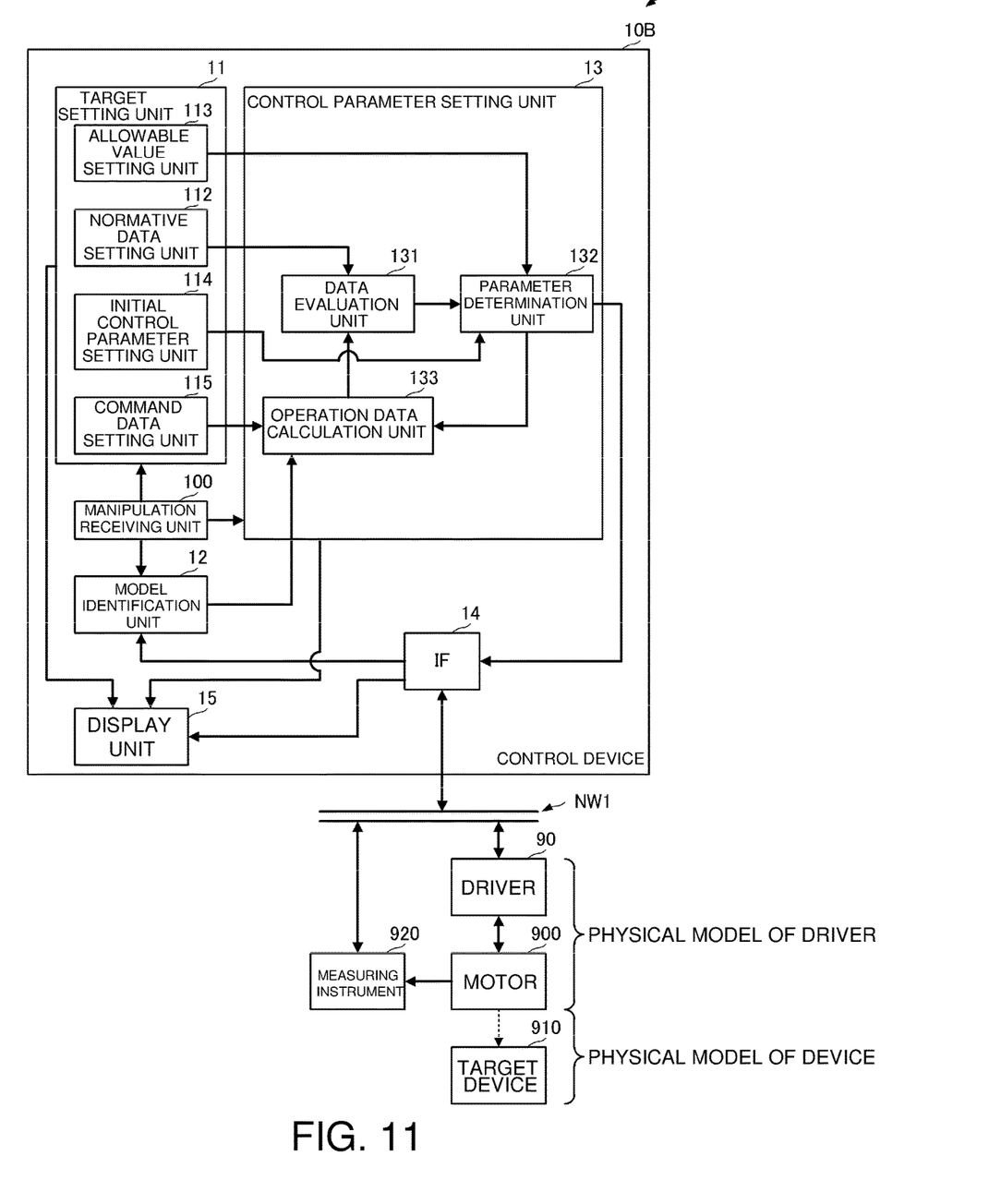
FIG. 11 is a block diagram illustrating a major configuration of a control device and a control system according to a third embodiment of the present disclosure.

Next, a control device, a control method, and a control program according to a third embodiment of the present disclosure will be described with reference to the drawings. FIG. 11 is a block diagram illustrating a major configuration of a control device and a control system according to the third embodiment of the present disclosure.

As illustrated in FIG. 11, a control system 1B according to the third embodiment differs from the control system 1A according to the second embodiment in that the former includes a network NW1 and a measuring instrument 920. Other components of the control system 1B are the same as those of the control system 1A and thus description of the same parts is omitted.

In a control device 10B, the display unit 15 is connected to the IF unit 14. In addition, the IF unit 14 is connected to the driver 90 and the measuring instrument 920 through the network NW1. In the control system 1B, the control device 10B outputs a control parameter to the driver 90 through the network NW1.

The measuring instrument 920 measures an operation value which is the basis of operation data of the motor 900. The measuring instrument 920 outputs the operation value to the control device 10B through the network NW1. The operation value is output to the display unit 15 and the display unit 15 generates actual operation data using the operation value. The display unit 15 replaces the actual operation data with operation data handled in the display unit 15 according to the second embodiment and display the same. Meanwhile, although the measuring instrument 920 has the motor 900 as a measurement target herein, the target device 910 may be set as a direct measurement target.

Figure 12:
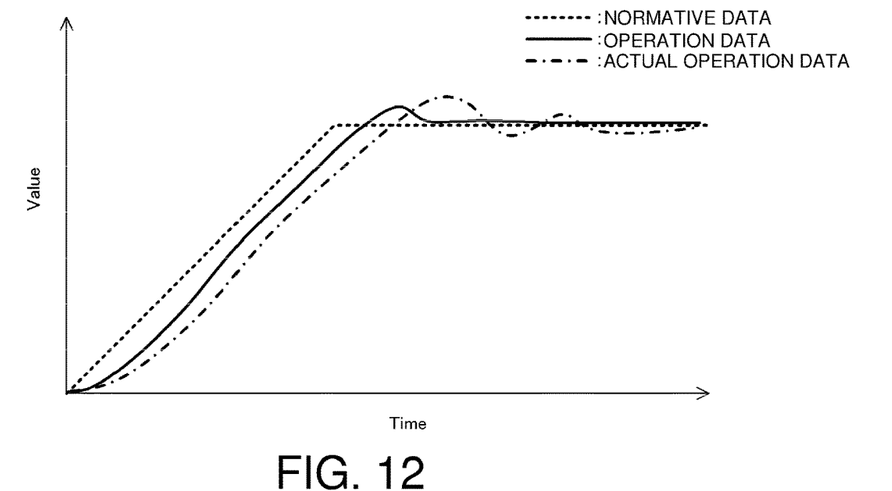
FIG. 12 is a diagram illustrating an example of a display image of a control device according to the third embodiment of the present disclosure.

In this configuration, the display unit 15 can display a graph as shown in FIG. 12. FIG. 12 is a diagram showing an example of a display image of the control device according to the third embodiment of the present disclosure. FIG. 12 is a graph showing time characteristics of normative data, operation data, and actual operation data.

As shown in FIG. 12, the display unit 15 displays normative data, operation data and actual operation data through one screen. Accordingly, the operator can compare the normative data, the operation data and the actual operation data on one screen.

Therefore, the operator can reliably and easily compare the actual operation data with the normative data and check the validity of control parameters. In addition, the operator can reliably and easily compare the actual operation data with the operation data and check the validity of physical model identification results.

Figure 13:
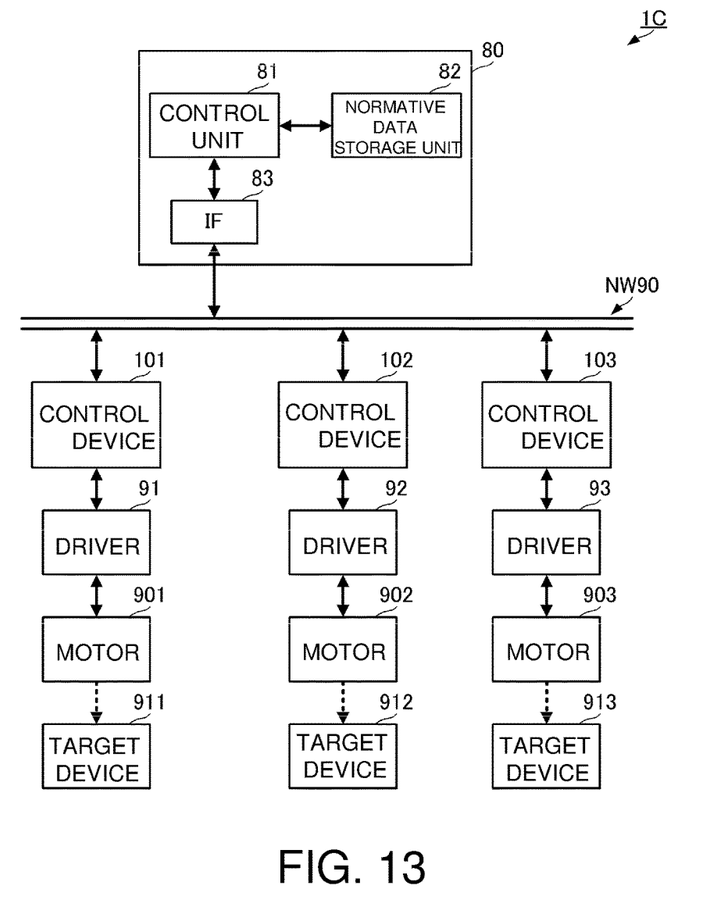
FIG. 13 is a block diagram illustrating a configuration of a control system according to a fourth embodiment of the present disclosure.

Next, a control system according to a fourth embodiment of the present disclosure will be described with reference to the drawings. FIG. 13 is a block diagram illustrating the control system according to the fourth embodiment of the present disclosure. Meanwhile, although a case in which there are three control devices, three drivers, three motors and three target devices will be described hereinafter, the configuration of the present embodiment can also be applied when there are two control devices, two drivers, two motors and two target devices and when there are four or more control devices, four or more drivers, four or more motors and four or more target devices.

As illustrated in FIG. 13, a control system 1C includes a server 80, control devices 101, 102 and 103, drivers 91, 92 and 93, motors 901, 902 and 903, and target devices 911, 912 and 913.

The control devices 101, 102 and 103 are the same as the aforementioned control devices 10, 10A and 10B, and the drivers 91, 92 and 93 are the same as the aforementioned driver 90. The motors 901, 902 and 903 are the same as the aforementioned motor 900, and the target devices 911, 912 and 913 are the same as the aforementioned target device 910. The control device 101 is connected to the driver 91, the driver 91 is connected to the motor 901, and the motor 901 is connected to the target device 911. The control device 102 is connected to the driver 92, the driver 92 is connected to the motor 902, and the motor 902 is connected to the target device 912. The control device 103 is connected to the driver 93, the driver 93 is connected to the motor 903, and the motor 903 is connected to the target device 913.

The server 80 includes a control unit 81, a normative data storage unit 82, and an interface (IF) unit 83. The server 80 is connected to a network NW90 through the IF unit 83, and connected to the control devices 101, 102 and 103 through the network NW90.

The control unit 81 executes each process which will be described below. The normative data storage unit 82 stores normative data.

Figure 14A:
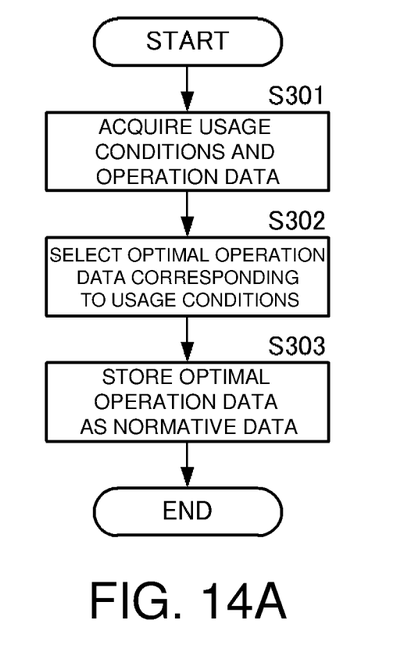
FIG. 14A is a flowchart illustrating a process of storing normative data in a server.

(Selection and storage of normative data according to usage conditions) FIG. 14A is a flowchart illustrating a process of storing normative data in the server.

As illustrated in FIG. 14A, the control unit 81 of the server 80 acquires usage conditions and operation data from the control devices 101, 102 and 103 (S301). The usage conditions include a temperature and the like when a driver, a motor and a target device are used. The control unit 81 selects optimal operation data corresponding to the usage conditions from multiple pieces of acquired operation data (S302). The control unit 81 stores the optimal operation data as nonnative data into the normative data storage unit 82 (S303). Here, the control unit 81 associates the normative data with the usage conditions and stores the normative data.

By performing this process, it is possible to select normative data corresponding to the usage conditions and store the selected normative data in the server 80. Accordingly, normative data corresponding to the usage conditions can be used in a plurality of control devices, as will be described below.

Figure 14B:
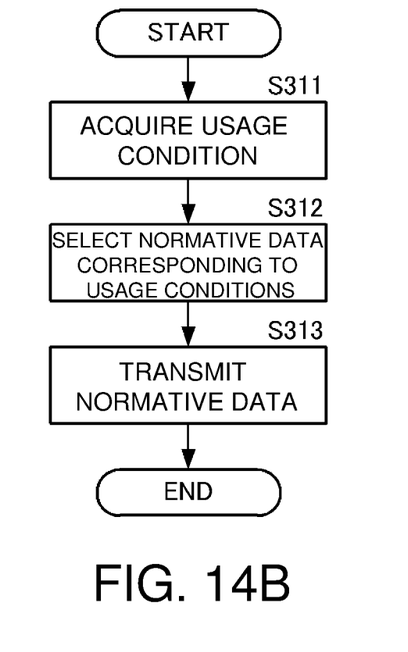
FIG. 14B is a flowchart illustrating a process of transmitting normative data in the server.

(Selection and transmission of the normative data corresponding to usage condition) FIG. 14B is a flowchart illustrating a process of transmitting normative data in the server.

As illustrated in FIG. 14B, the control unit 81 of the server 80 acquires a usage condition from a control device which requires acquiring normative data among the control devices 102, 102 and 103 (S311). The control unit 81 selects normative data corresponding to the usage condition and reads the normative data from the normative data storage unit 82 (S312). The control unit 81 transmits the selected normative data to the control device which requires acquiring normative data (S313).

By performing this process, the control devices 101, 102 and 103 can perform control parameter optimization by using the normative data corresponding to the usage condition.

Figure 15:
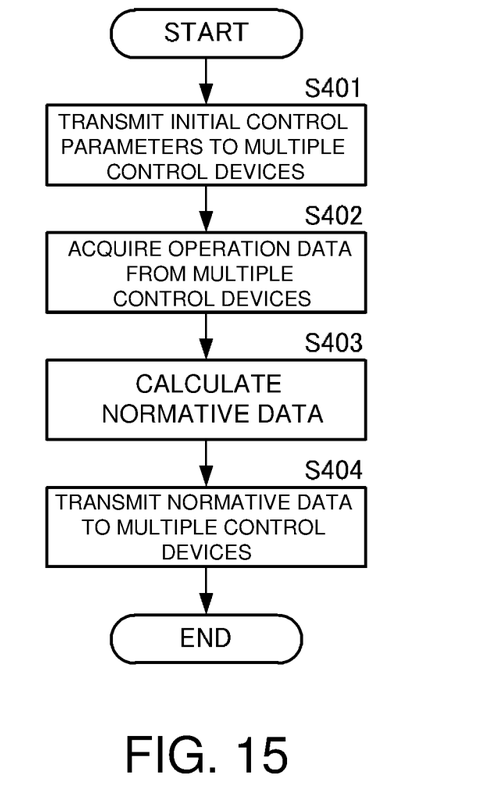
FIG. 15 is a flowchart illustrating a process of setting optimal normative data from operation data of a plurality of control devices and transmitting the optimal normative data to the plurality of control devices.

(Setting of optimal normative data from operation data of multiple control devices) FIG. 15 is a flowchart illustrating a process of setting optimal normative data from operation data of a plurality of control devices and transmitting the optimal normative data to the plurality of control devices.

As illustrated in FIG. 15, the control unit 81 of the server 80 transmits an initial control parameter to the multiple control devices 101, 102 and 103 (S401). The control unit 81 acquires operation data obtained on the basis of the initial control parameter from the multiple control devices 101, 102 and 103 (S402). The control unit 81 calculates normative data by using the operation data acquired from the multiple control devices 101, 102 and 103 (S403). Specifically, the control unit 81 calculates the average of multiple pieces of operation data, and calculates normative data from the average. The control unit 81 transmits the normative data to the multiple control devices 101, 102 and 103 (S404).

By performing this process, normative data having a small difference in control performance can be set for the multiple control devices 101, 102 and 103. In addition, the multiple control devices 101, 102 and 103 set control parameters using this normative data, and thus a difference in control performance between the control devices 101, 102 and 103 can be minimized.

What is claimed is:

1. A control device comprising:
    a model identification unit which identifies a physical model of an operation of a control target;
    an operation data calculation unit which calculates operation data of the control target by using a control parameter applied to the control target and the physical model;
    a data evaluation unit which calculates an evaluation value by using normative data of the operation of the control target and the operation data; and
    a parameter determination unit which determines the control parameter by using the evaluation value,
    wherein the normative data are initially set, wherein the evaluation value is based on a statistics analysis result according to a difference between the normative data and the operation data over a plurality of sampling times on the normative data and the operation data.

2. The control device according to claim 1, wherein
    an allowable value for the evaluation value is set, and
    the parameter determination unit changes the control parameter when the evaluation value is out of a range of the allowable value, and the operation data calculation unit calculates the operation data by using the control parameter changed by the parameter determination unit.

3. The control device according to claim 2, wherein the parameter determination unit outputs the control parameter serving as the basis of the evaluation value when the evaluation value is within the range of the allowable value.

4. The control device according to claim 3, wherein the data evaluation unit performs discrete sampling on the operation data and the normative data on a time axis and calculates the evaluation value by using a difference between the operation data and the normative data at each time of the discrete sampling.

5. The control device according to claim 3, comprising:
    a display unit which displays an evaluation image based on the operation data and the control parameter.

6. The control device according to claim 3, wherein the normative data is set for each usage condition.

7. The control device according to claim 2, wherein the data evaluation unit performs discrete sampling on the operation data and the normative data on a time axis and calculates the evaluation value by using a difference between the operation data and the normative data at each time of the discrete sampling.

8. The control device according to claim 2, comprising:
    a display unit which displays an evaluation image based on the operation data and the control parameter.

9. The control device according to claim 2, wherein the normative data is set for each usage condition.

10. The control device according to claim 1, wherein the data evaluation unit performs discrete sampling on the operation data and the normative data on a time axis and calculates the evaluation value by using a difference between the operation data and the normative data at each time of the discrete sampling.

11. The control device according to claim 10, comprising:
a display unit which displays an evaluation image based on the operation data and the control parameter.

12. The control device according to claim 10, wherein the normative data is set for each usage condition.

13. The control device according to claim 1, comprising:
a display unit which displays an evaluation image based on the operation data and the control parameter.

14. The control device according to claim 13, wherein the normative data is set for each usage condition.

15. The control device according to claim 1, wherein the normative data is set for each usage condition.

16. A control method comprising:
setting normative data for an operation of a control target;
setting an allowable value for determination of a control parameter;
identifying a physical model of the operation of the control target;
calculating operation data by using the physical model and the control parameter;
calculating an evaluation value by using the operation data and the normative data; and
determining the control parameter by using the evaluation value and the allowable value,
wherein the normative data are initially set, wherein the evaluation value is based on a statistics analysis result according to a difference between the normative data and the operation data over a plurality of sampling times on the normative data and the operation data.

17. A non-transitory computer readable storage medium recording a control program for causing an information processing device to execute:
a process of identifying a physical model of an operation of a control target;
a process of calculating operation data by using the physical model and a control parameter;
a process of calculating an evaluation value by using the operation data and nonnative data; and
a process of determining the control parameter by using the evaluation value and an allowable value,
wherein the normative data are initially set, wherein the evaluation value is based on a statistics analysis result according to a difference between the nonnative data and the operation data over a plurality of sampling times on the normative data and the operation data.

* * * * *